United States Patent [19]
Cook et al.

[11] Patent Number: 5,652,811
[45] Date of Patent: Jul. 29, 1997

[54] SEMICONDUCTOR ON FIBER OPTIC SUBSTRATE (SOFOS)

[75] Inventors: Paul Cook, Vernon; Franz Haas, Rome, both of N.Y.

[73] Assignee: The United States of America as represented by the Secretary of the Air Force, Washington, D.C.

[21] Appl. No.: 611,956

[22] Filed: Mar. 6, 1996

[51] Int. Cl.$^6$ .................................................. G02B 6/12
[52] U.S. Cl. ............................................. 385/14; 385/120
[58] Field of Search ................................. 385/12, 14, 15, 385/115, 120, 144, 88, 89

[56] References Cited

U.S. PATENT DOCUMENTS

| | | | |
|---|---|---|---|
| 4,741,595 | 5/1988 | Onoda et al. | 385/120 |
| 5,121,459 | 6/1992 | Chiang | 385/120 |
| 5,175,777 | 12/1992 | Böttle | 385/17 |
| 5,247,592 | 9/1993 | Inoue et al. | 385/16 |
| 5,295,216 | 3/1994 | Halter | 385/120 |
| 5,367,596 | 11/1994 | Chow | 385/120 X |

OTHER PUBLICATIONS

Jokerst, "Parallel Processing: Into The Next Dimension", Optics & Photonics News, Apr. 1994, pp. 8–14.

Evtikhiev, et al, "SAR system optoelectronic compact processor with LEDs array", Advances in Optical Information, vol. 1704, SPIE, 1992 [no month].

Brown, Chappel, "Spin–on films offer new option for VLSI", Electronics Eng. Times, Feb. 94 p. 42.

Werner, Ken, "Transferred–Silicon AMLCDs", Information Display, p. 21, [no date].

Yang, Y.J. et al, "Monolithic integration of a vertical cavity surface emitting laser and a metal semiconductor field effect transistor", Applied Physics Letters, vol. 62(6), 8 Feb. '93, pp. 600–602.

Matsuo, Shinji et al, "Monolithically Integrated Photonic Switching Device Using an MSM PD, MESFET's, and a VCSEL", IEEE Photonics Tech.Letters, vol. 7 No. 10, Oct. 95, pp. 1165–1167.

Evaldsson, P.A. et al., "Monolithic Integration of Lasers with Fet and Bipolar Transistors in Inversion Channel Technology", Electronics Letters, vol. 29(1), 1993, pp. 60–62.

*Primary Examiner*—John D. Lee
*Attorney, Agent, or Firm*—Stanton E. Collier

[57] ABSTRACT

A semiconductor on fiber optic substrate is composed of a thin layer of electronic grade semiconductor material which is bonded to a substrate which is a fiber optic plate. The fiber optic plate acts as a continuous sheet of optical waveguides to transport light between semiconductor layers with high efficiency and with little defocusing. Integrated circuits are constructed on the semiconductor layer. Chips of this combination can then be stacked and optically interconnected via the optical fibers compromising the fiber optic plate using light emitting and light receiving devices mounted on said semiconductor layers.

5 Claims, 4 Drawing Sheets

SEMICONDUCTOR ON FIBER OPTIC SUBSTRATE (SOFOS)

STATEMENT OF GOVERNMENT INTEREST

The invention described herein may be manufactured and used by or for the Government for governmental purposes without the payment of any royalty thereon.

BACKGROUND OF THE INVENTION

The present invention relates to semiconductor devices, and, in particular, relates to substrates upon which semiconductor devices are built, and, in greater particularity, relates to means for communicating between devices on separate substrates.

Today's electronics are comprised mainly of integrated circuits connected together by wires that act as current carrying paths. Wires can be modeled as reactive elements whose reactance is dominated by capacitance. To send a signal from one chip to another via the wire, the wire's capacitance must be charged or discharged through a voltage transition for every signal sent between devices. The act of charging and discharging a wire expends power producing unwanted heat that can destroy the electronic circuits.

In order for the circuit to remain at a safe operating temperature the number of voltage transitions per unit time the circuit can execute must be limited. If we shorten the wires connecting circuits together, the capacitance of these wires can be reduced and in turn reduce the current necessary to drive the wires and thereby reduce the power dissipated and the heat produced. Since we have reduced the power necessary to drive the wire through a voltage transition we can allow more voltage transitions per unit time and still be at a safe operating temperature. Thus the goal of running the circuits faster is achievable. Circuits can be moved closer together to shorten connecting wires but this approach can only be taken so far. The current state of the art here is exemplified by the stacking of integrated circuit memory chips with the interconnection wires being run out to the edge of each chip and then back underneath the chip to the connections on the adjacent chip. This is repeated to form a stack of chips that can replace a more bulky package. The advantage with this approach is a space savings. Although, at present, heating due to driving the wire interconnects is not a concern with this approach, at a high enough speed heating would again become a problem.

Optical Interconnects is an emerging technology that may make it possible to connect circuits without using wires. In this method a beam of light is used to traverse the distance between the circuits carrying information from one circuit to another. Light does not suffer the capacitive effect of electronics so heating due to the capacitance of connection wires could be eliminated allowing much faster operation of the circuits. By using light instead of electricity the number of transmissions per unit time as well as the number of interconnects per area can be increased. There are, however, some problems that must be solved before this approach can be successful.

In order to achieve a high density of connections the diameter of the light beam must be small. This poses a problem because even if the light emitting device that produces the beam emits light rays that are perfectly parallel as the light exits the device, after a short distance the light spreads and the rays are no longer parallel but rather, are diverging. This is a well known effect called diffraction. The result of this spreading is that by the time the light beam reaches the light detector the light has spread to many times its original diameter and only a fraction of the light falls on the detector. Since the receiver detects only a small amount of light signal, the signal is weak and must be greatly amplified so that it can be interfaced with standard circuitry. The process of amplification generates heat and limits the maximum speed at which information can be transferred. This would defeat the purpose of using optical interconnects. The spreading of the light could also cause light from one transmitter to fall on the detector of an adjacent channel causing a confusion of that signal with the signal of an another channel. This confusion of signals is called crosstalk and can cause errors in the transfer of information from one circuit to another. Successful application of optical interconnects therefore demands that only the light emitted by the transmitter of a given channel be detected by the receiver of that same channel. A way to channel the light in a controlled fashion from one circuit to another must be found for the optical interconnects approach to be successful.

There are basically two ways to accomplish this. One is to use a lens to collect the light from the transmitter and to then focus this light onto the receiver. Additionally, one lens can be made to collect the light from several transmitters and focus this light onto several receivers with very low crosstalk. The lens does this by imaging a group of transmitters in one plane onto a group of receivers on another plane. Another way to channel the light is using a wave guide or fiber optic. In this case the light enters a "tube" and is confined to travel down the length of the tube even if the tube bends. Using lens-like components to transfer light has some problems. It is not practical to make a conventional glass lens of the microscopic size that is required. Rather, one can make structures called diffractive optics that use period structures to focus light in much the same manner that a lens does. These structures can be made using the same techniques one uses to make electronic integrated circuits. In order to efficiently transfer light using diffractive optics sub micron features must be made. Although it is possible to make these features with current technology it is very expensive to do so. This makes the use of diffractive optics extremely uneconomical at this time. In addition the diffractive optic must be precisely aligned with respect to both the transmitter and the receiver. This alignment problem makes this approach unappealing.

The use of wave guides in microcircuits also has its problems. No commercially viable method exists to integrate optical wave guides with microelectronic circuits, either from point to point in the plane of the electronic circuit or from plane to plane.

Thus, there exists a need for a means of communicating between devices not requiting conventional wiring.

SUMMARY OF THE INVENTION

A wafer composed of a thin layer of electronic grade semiconductor material is bonded to a substrate which is composed of a fiber optic plate. The fiber optic substrate acts as a continuous sheet of optical waveguides to transport light between semiconductor layers with high efficiency and with little defocusing. Integrated circuits are constructed on the semiconductor layer. Chips of this combination can then be stacked and optically interconnected via the optical fibers comprising the fiber optic plate.

Therefore, one object of the present invention is to provide an optically interconnected multichip module (MCM).

Another object of the present invention is to provide a means of interconnected integrated circuit devices between modules without the use of conventional wiring thus providing them with large numbers of energy efficient interconnects.

Another object of the present invention is to provide a compact means of interconnection between integrated circuit devices.

Another object of the present invention is to provide a means of optically interconnected integrated circuit devices which provides high density, high reliability and ease of manufacture.

These and many other objects and advantages of the present invention will be ready apparent to one skilled in the pertinent art from the following detailed description of a preferred embodiment of the invention and the related drawings.

DETAILED DESCRIPTION OF THE PREFERRED EMBODIMENT

Figure 1A:
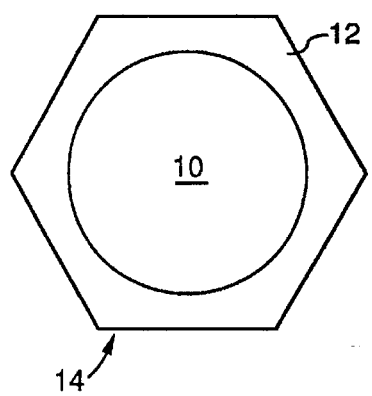
FIG. 1(a) illustrates a single fiber optic core and cladding thereabout.
Figure 1B:
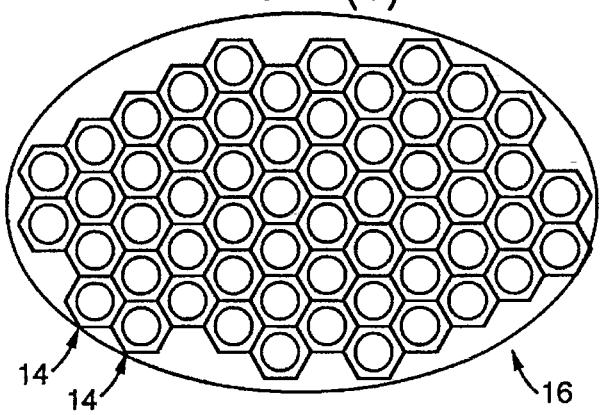
FIG. 1(b) illustrates a preform of fiber optic cores and cladding.
Figure 1C:
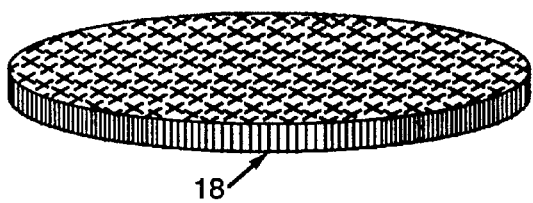
FIG. 1(c) illustrates a fiber optic plate formed from the preform of FIG. 1(b).
Figure 2A:
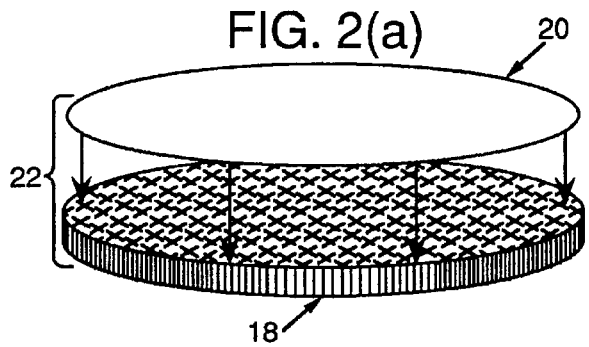
FIG. 2(a) illustrates a step wherein a thin semiconductor layer is placed on the fiber optic plate of FIG. 1(c).
Figure 2B:
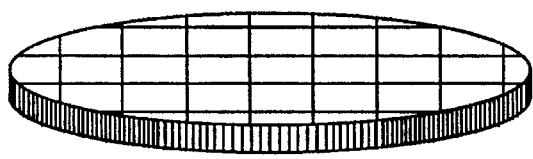
FIG. 2(b) illustrates schematically the modules formed on the wafer of 2(a).
Figure 2C:
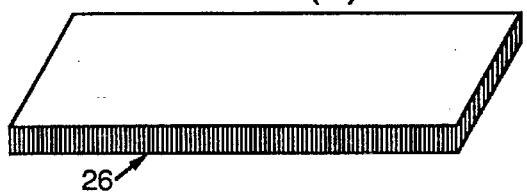
FIG. 2(c) illustrates a single module.
Figure 3:
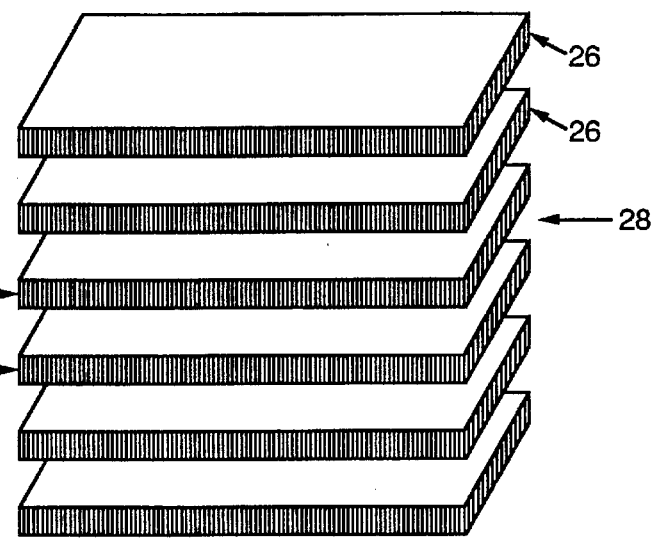
FIG. 3 illustrates the stacking of the modules of FIG. 2(c).
Figure 4A:
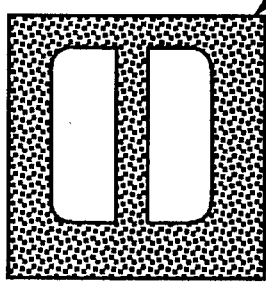
FIG. 4(a) illustrates an LED, 50 microns by 50 microns square, with a center stripe as an electrical contact.
Figure 4B:
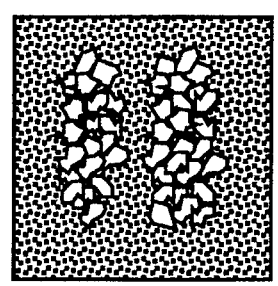
FIG. 4(b) illustrates the LED of FIG. 4(a) covered by the fiber optic plate of FIG. 1(c).

Referring to FIG. 1(a), a single fiber optic core 10 of appropriate material is surrounded by a cladding layer 12 to form a fiber optic 14. As seen in FIG. 1(b), a plurality of these fiber optics 14 are placed into a preform 16 which is processed in a conventional manner to produce a final product as seen in FIG. 1(c) which is a fiber optic plate 18. A fiber space of about 8 micrometers center-to-center is appropriate but smaller dimensions are available. In FIG. 2(a), an appropriate layer 20 of semiconductor material being very thin is placed on top of the fiber optic plate 18 to produce a semiconductor on a fiber optic substrate wafer 22. Using conventional integrated circuit processing techniques, integrated circuits, not shown, are placed on the semiconductor layer 20. An alternative processing technique allows the integrated circuits to be placed on the wafer and then this is placed on the fiber optic plate using the epitaxial liftoff technique. Included with the devices placed on the semiconductor layer 20 would be light emitting devices driven by appropriate means. A light emitting diode (LED) is shown in FIG. 4(a) which is 50 microns by 50 microns square. FIG. 4(b) illustrates the light pattern seen from the backside of the fiber optic substrate 22 from the emitting LED 24. FIG. 2(b) illustrates a module 26 having the integrated circuits thereon. In FIG. 3, a plurality of these modules are mounted together to form a multichip module 28.

The light emitting devices on the integrated circuit fiber optic module 26 emit light which is channeled through the fiber optic plate 30 to light receivers on the top of the next module 26. Because the spacing between the fiber cores in the plate 18 is very fine, the fibers form an essentially continuous sheet of wave guides and, as a result, alignment of the plates to the circuits in the semiconductor layer is not necessary, although, alignment from the circuits on one circuit fiber optic module 26 to the circuits on another module 26 is necessary.

Figure 5A:
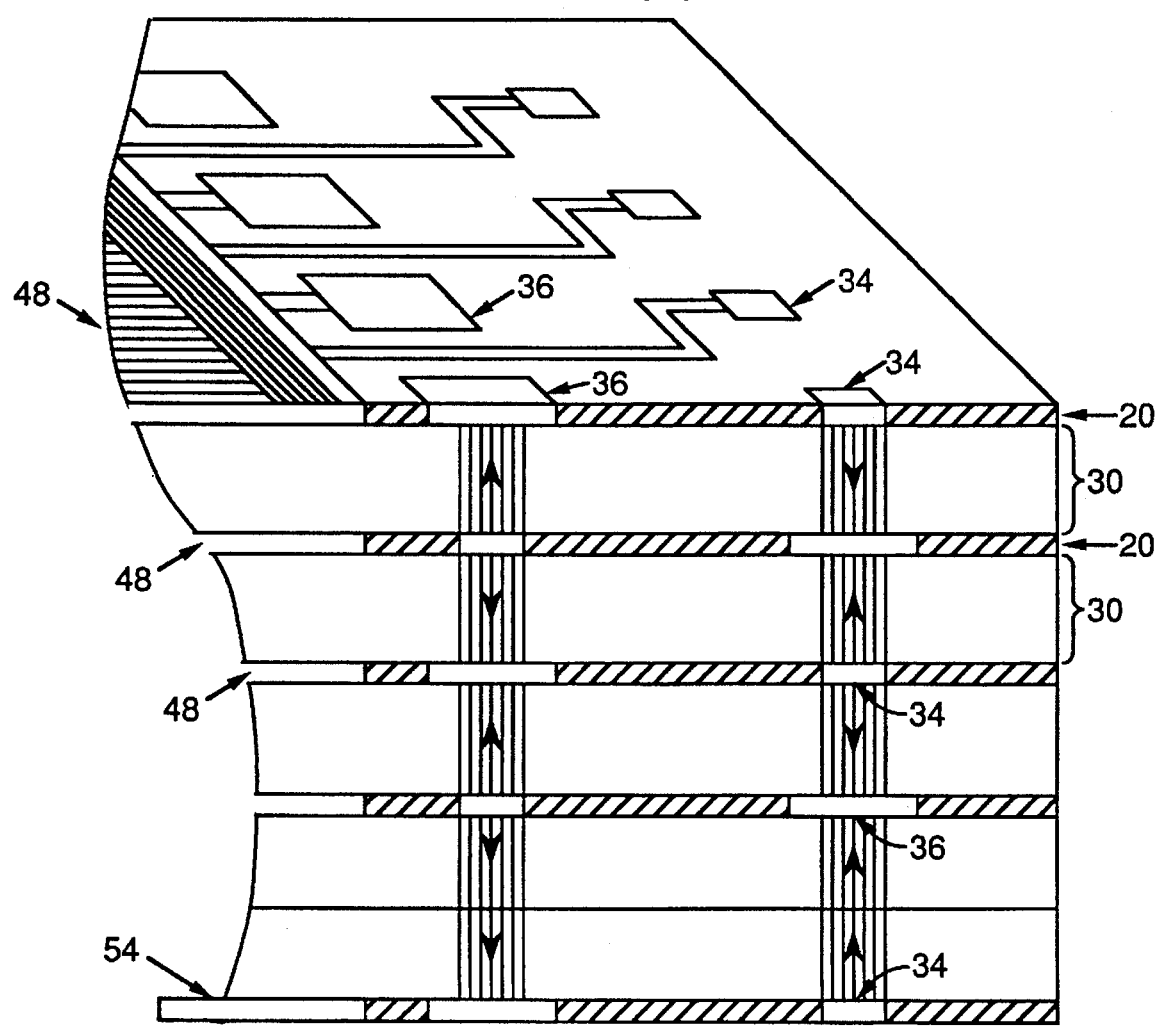
FIG. 5(a) illustrates a cross section of a chip stack with emitters and detectors alternating.
Figure 5B:
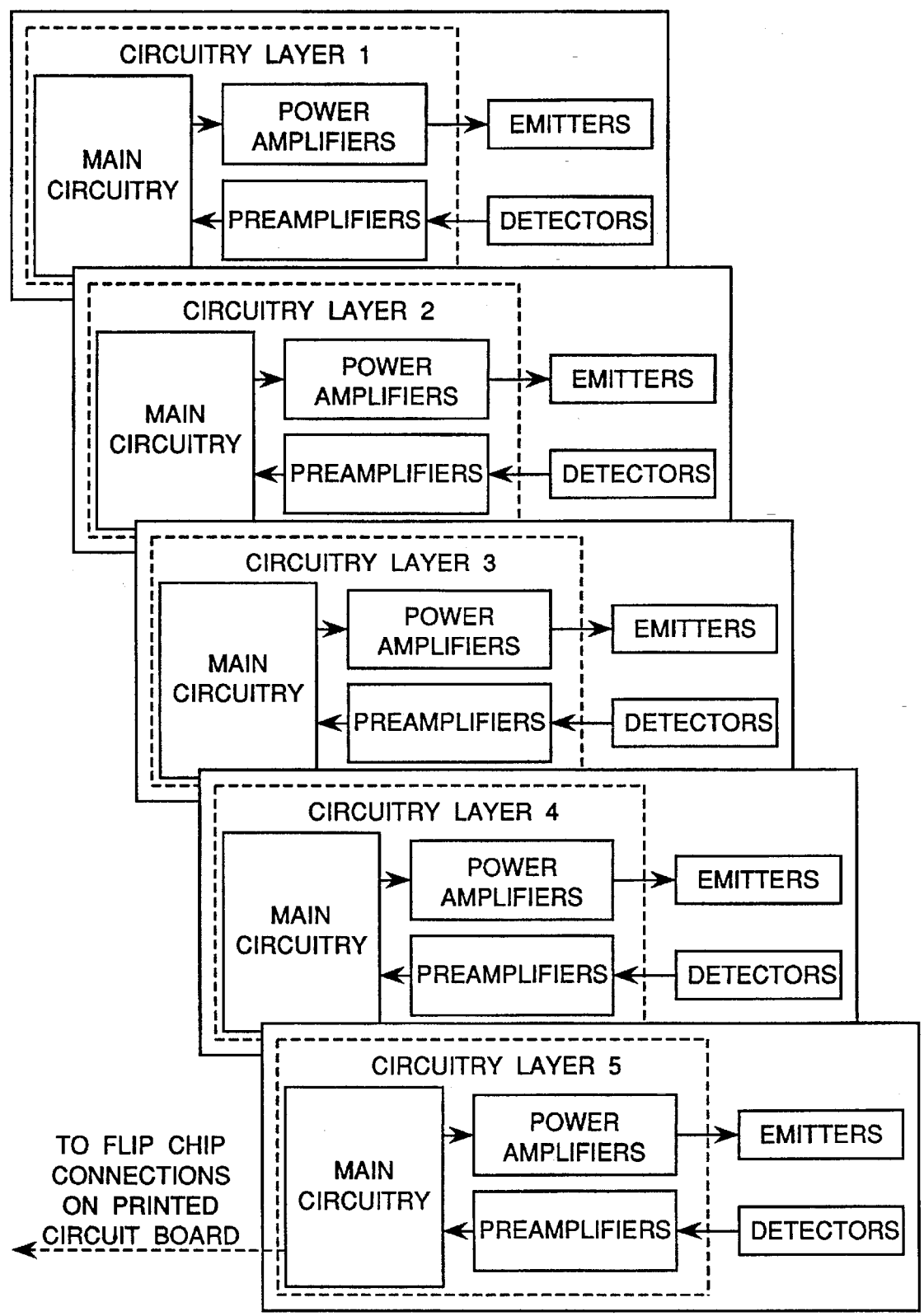
FIG. 5(b) illustrates a schematic view of the module stack.

FIG. 5(a) shows a cross section of the chip stack with emitters 34 and detectors 36 alternating places every other layer and part of circuitry areas 48 on the left. The direction the light is traveling is indicated by the arrows in the light columns of the fiber optic layers. When one layer initiates a signal the light is emitted in both directions by emitters 34 to adjacent layers and is detected by the detectors 36 in both directions from adjacent layers. This process is repeated up and down the stack until all the emitters 34 are on. After a delay the emitters 34 and the detectors 36 are reset making them ready for the next signal. Preamplifiers 50 and power amplifiers 52 are used as an interface between the circuitry and the detectors 36 and emitters 34. The interface circuitry 54 is flipped with respect to the other modules and located on the bottom so that flip chip connections can be made to a circuit board. FIG. 5(b) shows a block diagram depicting the layers of the stack schematically.

Figure 6:
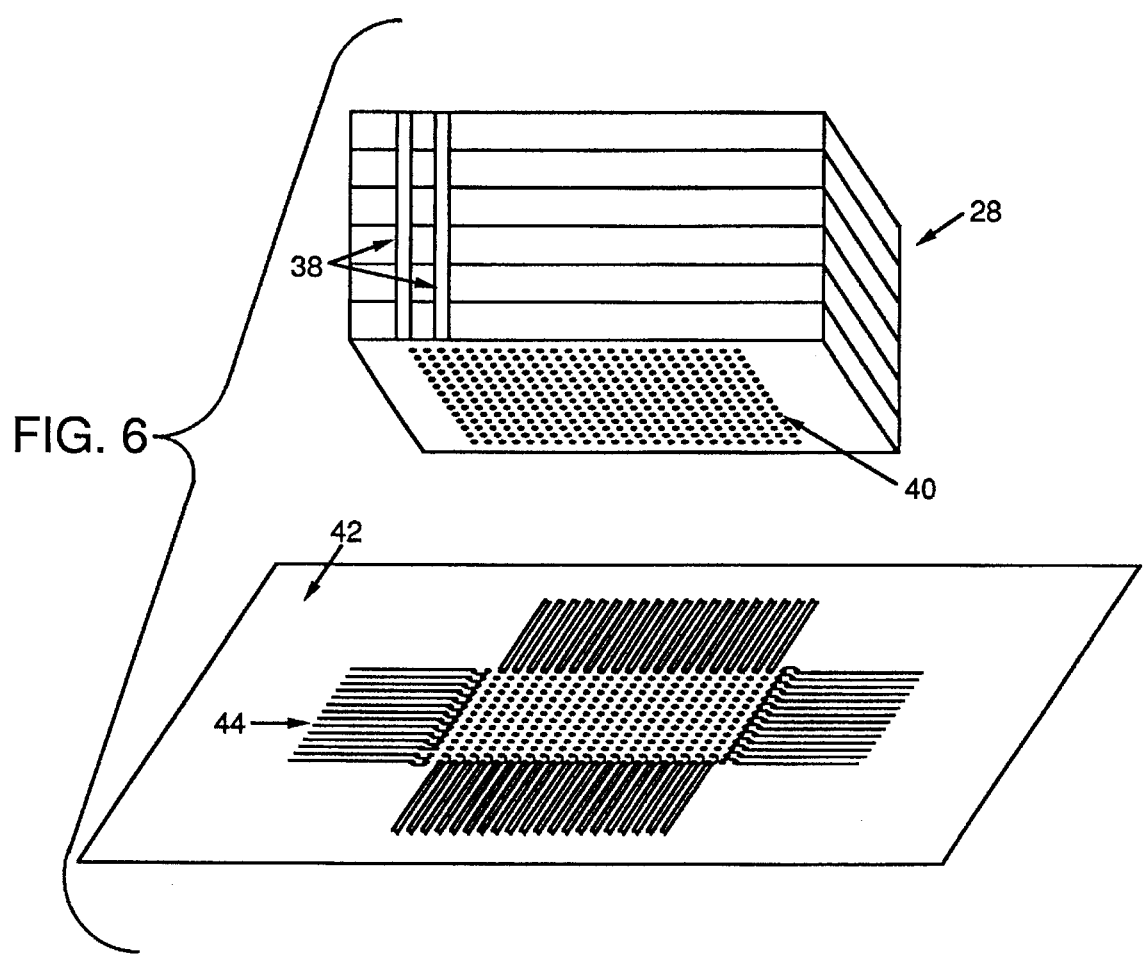
FIG. 6 illustrates connecting a chip module to a PC board.

FIG. 6 illustrates means for connecting a multichip module 28 to a printed circuit board 42. Wire connections are brought out from an interface chip located at the bottom of the stack so it can then be easily connected to the printed circuit's connections to devices outside the chip. The whole stack could be flip chip mounted using bump bonds as shown. These connections would not have to be as high speed as the optical connections internal to the chip stack since peripheral devices do not require the speed that is required in the computer proper. Traces 38 for power and ground are brought out to the edges of the chip modules 28. These traces are then connected together to a wire or printed circuit trace where the multichip module 28 can be fed power and ground return. A similar technique is commonly used in memory stacks currently in production.

We claim:

1. A multichip stacked module, said multichip stacked module comprising at least two optically interconnected modules, each of said optically interconnected modules comprising:

a fiber optic plate, said fiber optic plate being composed of a plurality of bonded clad fiber optic cores forming light channels, said cores being sufficiently close to provide an almost continuous optical waveguide therethrough;

a semiconductor layer, said semiconductor layer being deposited on said fiber optic plate; and a plurality of integrated circuits on said semiconductor layer, said integrated circuits including a plurality of light emitting and light receiving devices;

whereby a stacking of said optically interconnected modules allows for optical communication between said modules through said fiber optic plates by means of said light emitting and light receiving devices.

2. An optically interconnected module as defined in claim 1 further including a plurality of said modules mounted together to form a multichip stacked module, said stacked module optically communicating between said modules, said modules being in physical contact and being positioned adjacent to one another in a vertical manner, said interconnected modules communicating through fiber optic plates between integrated circuits on said modules, said communicating being by means of light transmitted by light emitting devices and received by light detectors, said light emitting devices and said light detectors being accurately placed on said fiber optic plate to minimize cross talk and loss of signal strength.

3. An optically interconnected module as defined in claim 2 further including an interface module, said interface module having said multichip stacked module mountable thereon and said interface module being mountable to a printed circuit board.

4. An optically interconnected module as defined in claim 3 wherein said interface module is mounted to said printed circuit board by means of bump bonds.

5. A means for communicating between integrated circuits upon different chips, said means comprising:

at least one light emitting device, said light emitting device being part of a first integrated circuit, said first integrated circuit being fabricated upon a semiconductor material layer on a first fiber optic plate; and at least one light receiving device, said receiving device being part of a second integrated circuit, said second integrated circuit being fabricated upon a semiconductor material layer on a second fiber optic plate, said first and said second semiconductor material layer being able to emit said light and receive said light, respectively, therefrom;

said at least one light receiving device being mounted opposite to said light emitting device, said light emitting device outputting said light through said fiber optic plate to be received by said light receiving device.

* * * * *